(12) United States Patent
Okumura et al.

(10) Patent No.: US 7,195,441 B2
(45) Date of Patent: Mar. 27, 2007

(54) MANIPULATOR HAVING ARM MECHANISM FOR HAND

(75) Inventors: Ichiro Okumura, Chiba (JP); Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/802,819

(22) Filed: Mar. 18, 2004

(65) Prior Publication Data
US 2004/0196546 A1   Oct. 7, 2004

(30) Foreign Application Priority Data
Mar. 19, 2003   (JP)   ............... 2003-076654

(51) Int. Cl.
*B25J 17/02* (2006.01)
(52) U.S. Cl. ............... 414/735; 74/490.06; 414/917; 901/29
(58) Field of Classification Search ............... 414/735, 414/729, 680, 917; 901/28, 29, 22; 74/490.01, 74/490.05, 490.06; 359/391, 392, 804
See application file for complete search history.

(56) References Cited

U.S. PATENT DOCUMENTS

| | | | | |
|---|---|---|---|---|
| 3,731,820 A | * | 5/1973 | Niki et al. ............... | 414/753.1 |
| 4,976,582 A | * | 12/1990 | Clavel ............... | 414/729 |
| 5,053,687 A | * | 10/1991 | Merlet ............... | 901/29 X |
| 5,114,300 A | | 5/1992 | Shahinpoor et al. ........ | 414/729 |
| 5,476,357 A | * | 12/1995 | Arai ............... | 414/729 |
| 5,651,574 A | * | 7/1997 | Tanikawa et al. ......... | 901/29 X |
| 6,484,602 B1 | * | 11/2002 | Dagalakis et al. ....... | 74/490.08 |
| 6,558,107 B1 | | 5/2003 | Okuno ............... | 414/744.5 |

FOREIGN PATENT DOCUMENTS

| | | |
|---|---|---|
| JP | 6-170761 | 6/1994 |
| JP | 7-256575 | 10/1995 |
| JP | 2000-208588 | 7/2000 |
| JP | 2002-103298 | 4/2002 |
| JP | 2002-217269 | 8/2002 |

* cited by examiner

*Primary Examiner*—Donald Underwood
(74) *Attorney, Agent, or Firm*—Fitzpatrick, Cella, Harper & Scinto

(57) ABSTRACT

According to this invention, there is provided a manipulator which can be suitably used as a compact manipulator apparatus which manipulates a minute target object. A manipulator of this invention includes, for example, a plurality of arm members whose attitudes can be changed and a manipulation target object manipulating hand mounted on the plurality of arm members through a connecting portion. Rotation of the hand or similar motion is caused by changing the attitudes of the plurality of arm members.

2 Claims, 10 Drawing Sheets

FIG. 6A
FIG. 6B
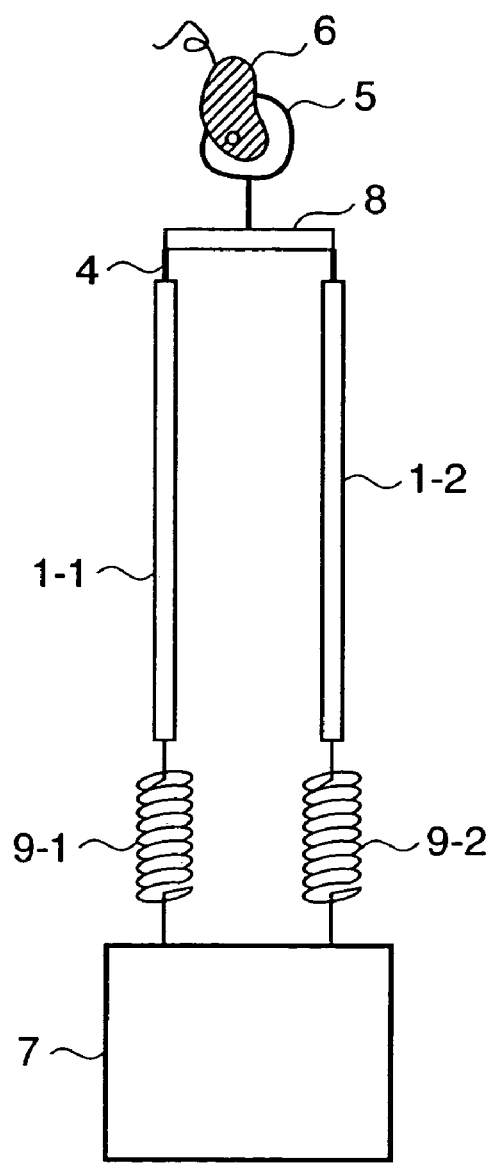
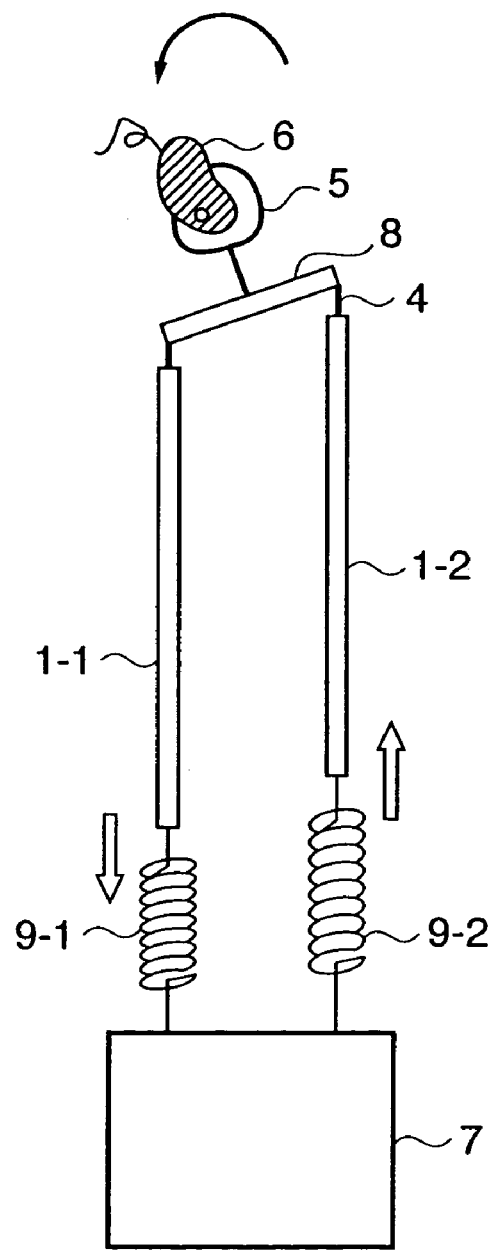

MANIPULATOR HAVING ARM MECHANISM FOR HAND

FIELD OF THE INVENTION

The present invention relates to a manipulator used as a minute component assembly apparatus which assemblies a minute object such as a micromachine component or unit by using a magnifying observation device such as an optical microscope, electron microscope, or scanning tunneling microscope, or a compact manipulator apparatus which performs diagnosis, medical treatment, research, biological production, or the like by physically manipulating, for example, minute tissues, cells, or genes of a living body and a minute object manipulating apparatus using the manipulator, more particularly, to a manipulator having an arm mechanism such as a micro-arm mechanism for a micro-hand.

BACKGROUND OF THE INVENTION

There has been known the technique of turning over a minute object by rotating a regular size arm using a regular size bearing and the technique of performing a necessary process on a minute work in a working device by rotating an arm or tool along an arcuated guide (see, for example, Japanese Patent Laid-Open No. 7-256575).

In a conventional apparatus like those described above, if a minute object is not located on the rotation axis of a bearing or arcuated guide, the minute object moves out of the visual field or depth of focus of a microscope when it is turned over. This makes it necessary to position the microscope and minute object again.

Using an arm mechanism similar in size to a manipulation target object may relatively facilitate alignment. However, many micro-actuators suitable for micro-mechanisms are made of linearly expandable materials such as piezoelectric materials and shape-memory alloys. In addition, it is difficult to manufacture rotary motors and the like which are small enough to be suitable for micro-mechanisms, because they have complicated structures. Furthermore, it is difficult to manufacture minute bearings and minute arcuated guides. This leads to relatively large backlash and the poor operability of manipulators. Under the circumstances, there have been no micro rotating mechanisms which are manipulated under microscopic observation.

Moreover, when the force of a microactuator which linearly expands/contracts is to be converted into a large-angle rotational action, a linear/rotational motion conversion mechanism for converting a minute linear motion into a rotational motion, a speed increasing mechanism for increasing a small-angle rotational motion to a large-angle rotational motion, and the like are required. As a consequence, the overall mechanism becomes complicated, and hence becomes difficult to be small and compact.

SUMMARY OF THE INVENTION

The present invention has been made in consideration of the above problems, and has its object to provide a manipulator which has an arm mechanism for a hand and is suitably used as a compact manipulator apparatus which manipulates a minute target object, and a minute object manipulating apparatus using the manipulator.

In order to achieve the above object, according to the present invention, there is provided a manipulator comprising: a plurality of arm members whose attitudes can be changed; and a manipulation target object manipulating hand mounted on the plurality of arm members through a connecting portion, wherein rotation of the hand or similar motion is caused by changing the attitudes of the plurality of arm members.

According to this arrangement, since a simple mechanism (e.g., an elastic deformation mechanism suitable for a micro-mechanism or a microactuator which linearly acts) can be used to change the attitudes of a plurality of arm members to a crossing state, a parallel state, or the like, an arm mechanism which causes rotation of a hand which grasps a manipulation target object or similar motion (e.g., rotation of the wrist of the hand or rotational motion which changes the angle of the wrist of the hand) can be easily realized. In general, a mechanism using elastic deformation with no friction or backlash is more suitable for a micro-mechanism than a mechanism accompanying relative movement such as the sliding and rolling motions of a bearing and guide. The arrangement of the present invention can easily realize a compact rotation mechanism which can use elastic deformation (torsional elastic deformation or bending elastic deformation) and has high performance.

The following aspects can be provided on the basis of the basic arrangement.

According to an aspect, this arrangement includes an actuator which is coupled to at least one of arm members in terms of manipulation and changes the attitudes of the plurality of arm members, and the actuator is controlled to cause rotation of the hand or similar motion.

More specifically, the arrangement includes a plurality of rod-like arm members which are arranged almost parallel and an actuator which linearly acts to change the attitudes of the plurality of arm members, and the actuator is caused to expand/contract to cause rotation of the hand or similar motion. An arrangement which allows at least one of arm members to also serve as an actuator can also be provided.

More specifically, according to an aspect, this arrangement includes two rod-like arm members which are arranged almost parallel and an actuator which linearly acts to bring portions of the two parallel arm members close to each other or restore them to their original positions, bending members which relatively easily undergo bending deformation to help the movement of the arm members and torsion members which are portions of the connecting portion and relatively easily undergo torsional deformation are connected to portions of the two parallel arm members, and the actuator is caused to contract to make the two parallel arm members cross each other to rotate the wrist of the hand (the structure shown in FIGS. 1A and 1B to be described later is an example of this structure). Obtaining rotational motion about the arm axis in this manner makes it possible to turn a work over within the visual field and depth of focus of a microscope.

In addition, this arrangement includes two rod-like arm members which are arranged almost parallel and an actuator which linearly acts to extend or withdraw the two parallel arm members in the axial direction, bending members which are portions of the connecting portion and relatively undergo bending deformation are connected to portions of the arm members, and one of the two parallel arm members is extended or withdrawn to cause rotational motion which changes the angle of the wrist of the hand (the structure shown in FIGS. 6A and 6B to be described later is an example of this structure).

Furthermore, this arrangement includes three rod-like arm members which are arranged almost parallel and an actuator which linearly acts to extend or withdraw the three parallel arm members in the axial direction, bending members which are portions of the connecting portion and relatively easily undergo bending deformation are connected to portions of the arm members, and a combination of extending and withdrawing the three parallel arm members in the axial direction causes rotational motion which changes the angle of the wrist of the hand (the structure shown in FIG. 7 to be described later is an example of this structure). The above connecting portion may be formed such that the rotation center is set near the central portion of the hand to make the rotation center of the rotational motion of the hand almost coincide with a manipulation target object (the structure shown in FIG. 8 to be described later is an example of this structure).

Moreover, a minute object manipulating apparatus of the present invention which achieve the above object includes the above manipulator (microactuator), a magnifying observation device for magnifying observation of a manipulation target object and a hand (micro-hand), and a remote controller for remote control on the manipulator. Such a manipulating apparatus which makes the most of the advantages of the above manipulator allows the operator to control the operation of the hand using the remote controller and easily control the position and posture of a minute object grasped by the hand by rotating it while observing the minute object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are views for explaining a mechanism which is the second embodiment of the manipulating apparatus of the present invention and is suitable for rotating a manipulation target object;

DETAILED DESCRIPTION OF THE PREFERRED EMBODIMENTS

Preferred embodiments of the present invention will now be described in detail in accordance with the accompanying drawings.

First Embodiment

Figure 1A:
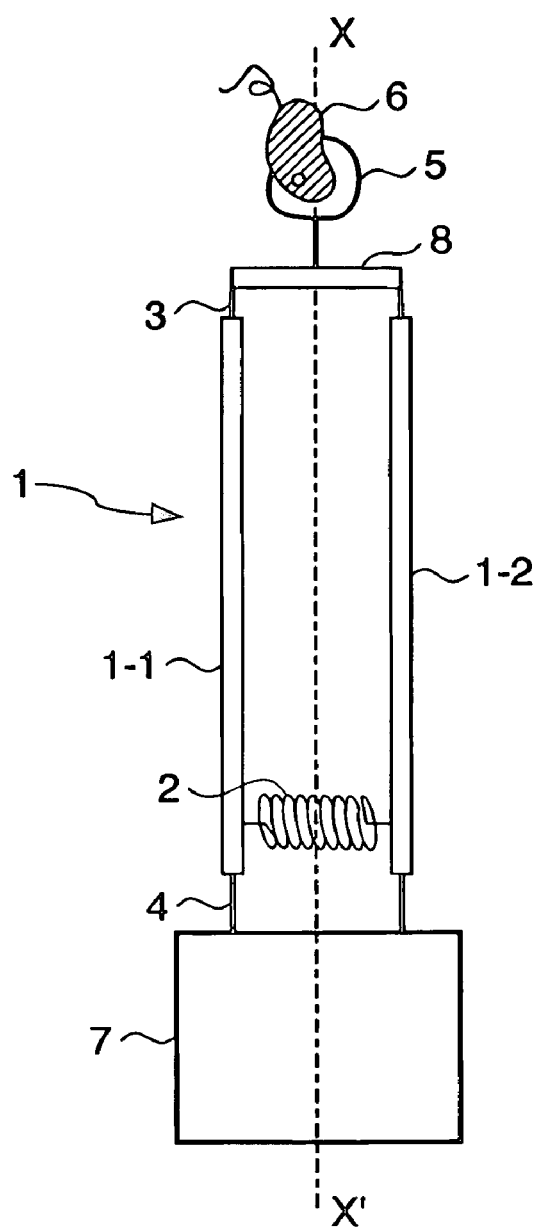
FIGS. 1A and 1B are views for explaining a mechanism which is the first embodiment of the manipulating apparatus according to the present invention and is suitable for turning over a manipulation target object and rotating it.
Figure 1B:
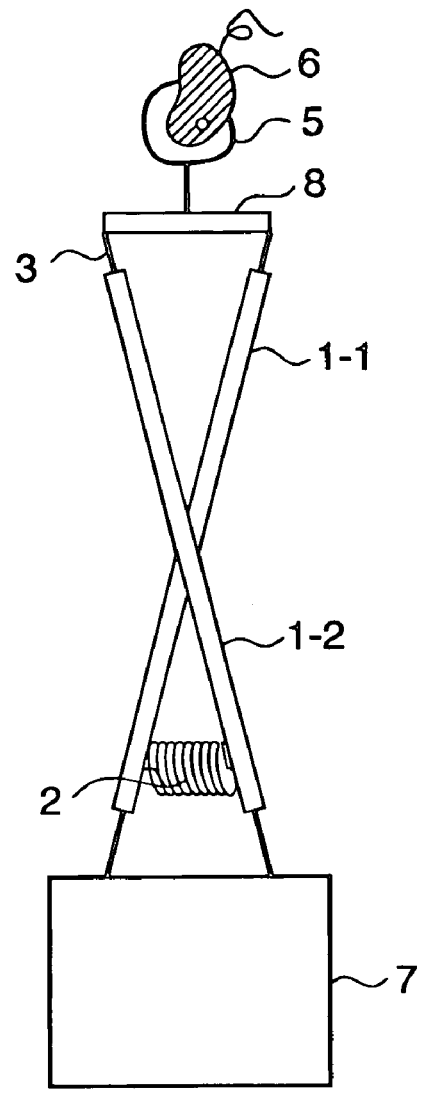

FIGS. 1A and 1B are views which are most indicative of the characteristics of the first embodiment of a working device having an arm mechanism for a hand according to the present invention. Referring to FIGS. 1A and 1B, reference numeral 1 denotes an arm for a micro-hand, which is constituted by two rod-like members 1-1 and 1-2. The rod-like members 1-1 and 1-2 of the arm have a structure which relatively high rigidity. Reference numeral 2 denotes a microactuator obtained by forming a wire made of a shape-memory alloy into a coil spring. When the microactuator 2 is heated by causing a current to flow in the microactuator 2 or irradiating it with a strong beam like a laser beam, the microactuator 2 contracts. When the microactuator 2 is cooled by stopping the current or irradiation of light, the microactuator 2 expands to the original length. The microactuator 2 may be a wire itself which is made of a shape-memory alloy that can bend and linearly expand, a bimorph actuator which is made of a piezoelectric material and can bend and linearly expand, an air tube that expands using pneumatic pressure, or an expandable actuator like an artificial muscle.

Figure 3:
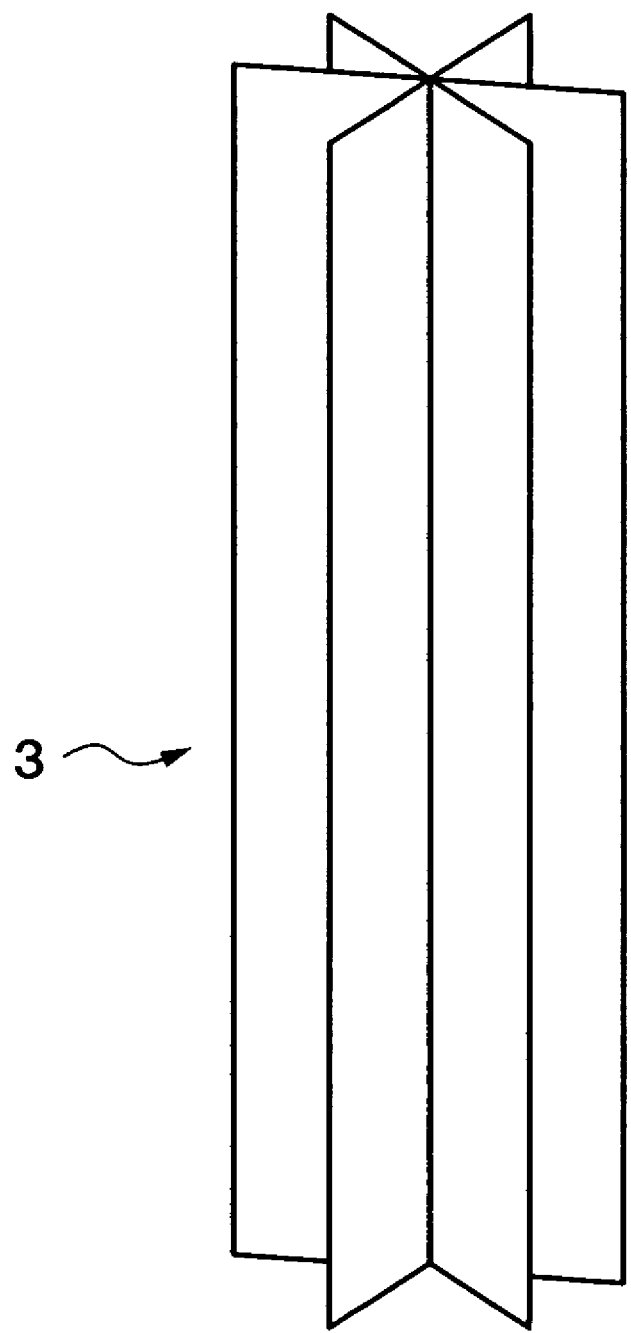
FIG. 3 is a perspective view showing an example of a torsion member according to the first embodiment.
Figure 4:
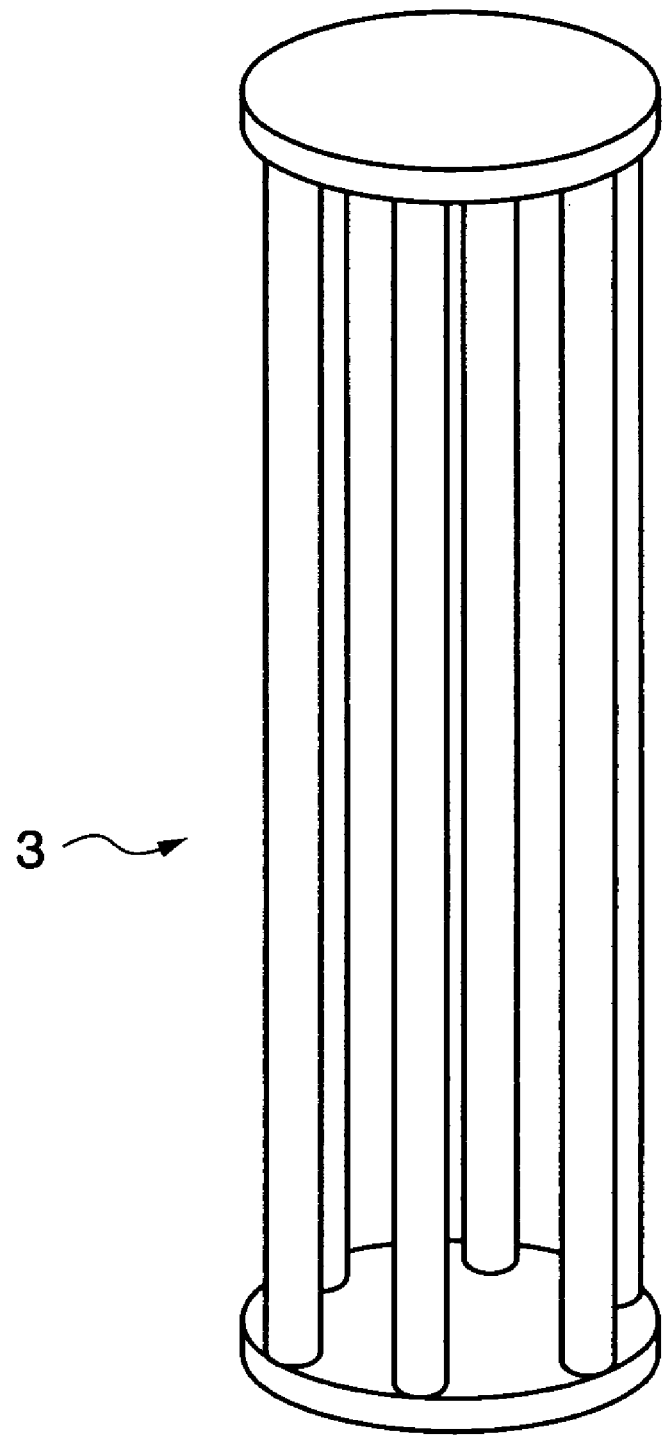
FIG. 4 is a perspective view showing another example of the torsion member according to the first embodiment.
Figure 5A:
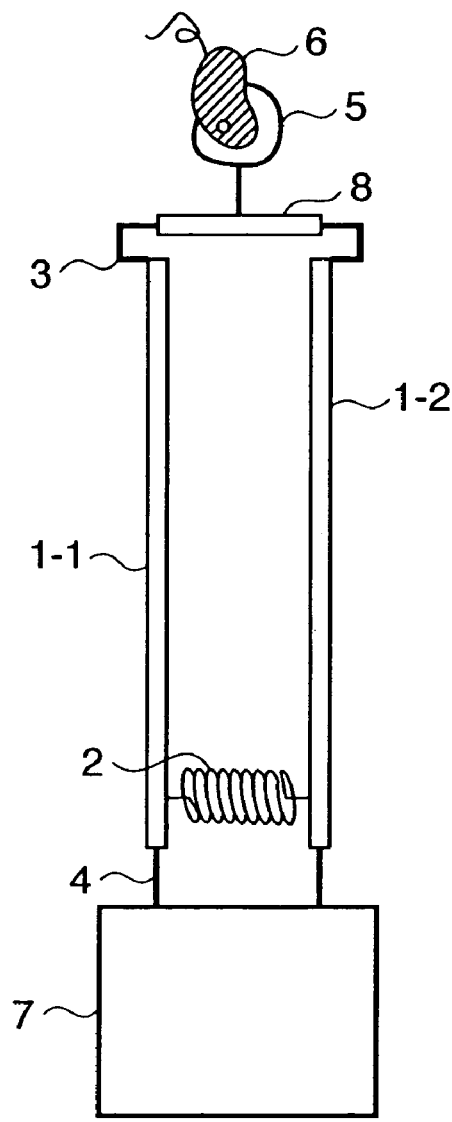
FIGS. 5A and 5B are views showing an example of another torsion member according to a modification to the first embodiment.
Figure 5B:
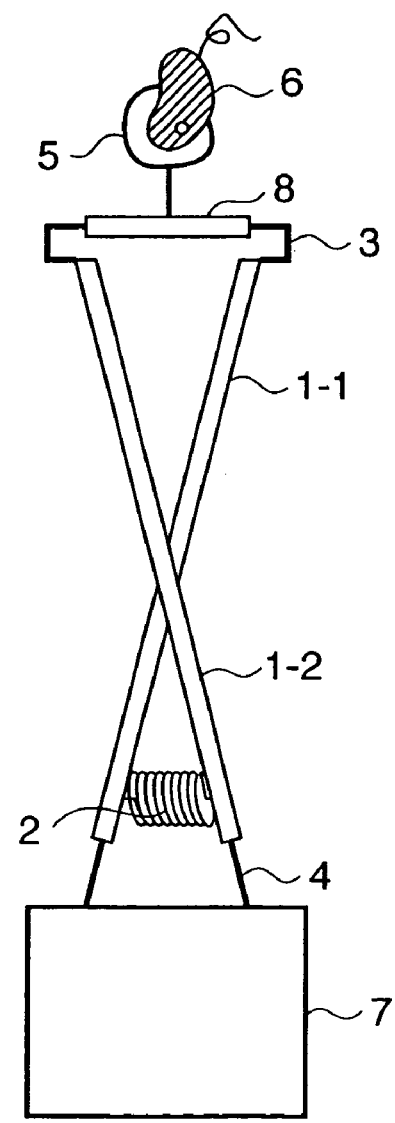

Reference numeral 3 denotes a torsion member. When the arm 1 rotates about an axis X-X' as shown in FIG. 1B, the torsion members 3 torsionally deforms to allow a finger 5 and finger mount member 8 (to be described later) to smoothly rotate. In this embodiment, as the torsion member 3, a member thinner than the rod-like members 1-1 and 1-2 is used to make it easy for the torsion member 3 to twist. Using a member having a radial cross-section like that shown in FIG. 3 for the torsion members 3 allows it to be easily twisted because of its low torsional rigidity and also allows it to be easily manipulated because of its high bending rigidity. The same applies to a torsion member formed from many thin members arranged parallel as shown in FIG. 4. As is known, a simple bent shape like that of the modification shown in FIGS. 5A and 5B allows easy twisting of the torsion member. Although the structures using torsional elastic deformation have been exemplified, a bearing such as a rolling bearing or sliding bearing may be used as in the case of a conventional general machine. However, since it is difficult to manufacture a bearing for a micro-mechanism, a torsional elastic deformation structure is more suitable for a micro-mechanism.

Reference numeral 4 denotes a bending elastic member. When the arm 1 rotates about the axis X-X' as shown in FIG. 1B, the bending members 4 torsionally deforms to allow the attitudes of the rod-like members 1-1 and 1-2 of the arm to smoothly change. Reference numeral 7 denotes a base which is, for example, the distal end portion of a positioning manipulator. The bending members 4 may be omitted, and the rod-like members of the arm may be directly and pivotally mounted on the base 7 by using micro-bearings or the like.

The finger or hand 5 grasps and manipulates a manipulation target object 6 such as a cell, bacterium, or minute mechanical component. As the finger 5, any kind of member can be used as long as it can grasp and manipulate the manipulation target object 6. There are no limitations on the operation form (stationary or movable), the number of manipulation distal end portions, and the like. The finger 5 is mounted on the finger mount member 8. The finger mount member 8 has a structure with relatively high rigidity like the arms 1-1 and 1-2 of the arm. The finger mount member 8 and torsion members 3 constitute a connecting portion which connects the arm 1 to the finger 5.

Referring to FIGS. 1A and 1B and 5A and 5B, the torsion members 3 are placed on the distal ends of the rod-like members 1-1 and 1-2. However, the torsion members 3 need not always be placed on the distal ends and may be placed on the base side or intermediate portions of the arm 1. Alternatively, the rod-like members 1-1 and 1-2 of the arm may have a structure which causes torsional deformation, and the torsion members 3 may be omitted.

The operation of this embodiment having the above arrangement will be described. For example, a current is supplied to the memory-shape alloy actuator 2 in the form of a coil spring to generate heat by its electric resistance in the state shown in FIG. 1A in which the manipulation target object 6 is grasped by the finger 5. As is known, a shape-memory alloy has the property of quickly deforming when its temperature exceeds a predetermined temperature. In this case, the coil spring 2 contracts when its temperature exceeds a given temperature (FIG. 1B). When the current stops and the coil spring 2 is cooled, it expands to its original length (FIG. 1A).

When the memory-shape alloy actuator 2 contracts, the base 7, arm 1, and finger mount member 8 having high rigidity do not deform, but the torsion member 3 and bending member 4 undergo torsional deformation and bending deformation, respectively. As a consequence, the arms 1-1 and 1-2, which have been parallel as shown in FIG. 1A, intersect each other as shown in FIG. 1B. At this time, the direction of the finger mount member 8 is almost reversed with respect to the state shown in FIG. 1A. Therefore, the finger 5 and the manipulation target object 6 which is grasped by it are also reversed in direction. The manipulation target object 6 can be turned upside down when observed in a direction perpendicular to the drawing surface with a microscope.

Figure 2:
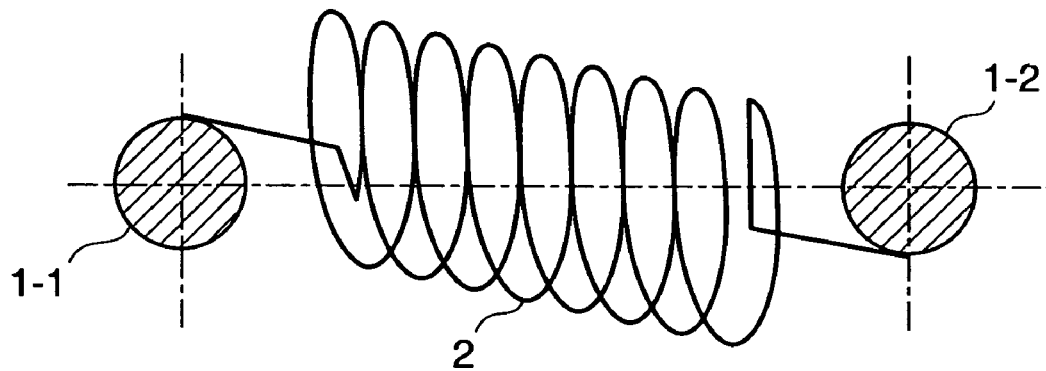
FIG. 2 is a view for explaining a preferable mount structure for an actuator according to the first embodiment.

FIG. 2 is a view showing a mount structure for the memory-shape alloy actuator 2 and rod-like members 1-1 and 1-2 when viewed from the direction of the axis X-X'. If the point of action of the force of the memory-shape alloy actuator 2 is shifted from a line connecting the centers of cross-sections of the rod-like members of the arm, when the memory-shape alloy actuator 2 contracts, the rod-like members 1-1 and 1-2 of the arm smoothly rotate in the counterclockwise direction relative to the manipulation target object 6. If the point of action of the force is aligned with the line connecting the centers of the cross-sections of the rod-like members of the arm, the force balances and no rotation occurs, or it cannot be predicted whether clockwise or counterclockwise rotation occurs, if ever it occurs.

Second Embodiment

FIGS. 6A and 6B are views which are most indicative of the characteristics of the second embodiment. The same reference numerals as in FIGS. 1A and 1B denote the same parts in FIGS. 6A and 6B. Reference numerals 9-1 and 9-2 denote microactuators each of which is similar to the microactuator 2 in the first embodiment and obtained by forming, for example, a shape-memory alloy wire into the shape of a coil spring. This is the same as described in the first embodiment. In the second embodiment, however, the microactuators are provided on the mount portions of rod-like members 1-1 and 1-2 of an arm which are mounted on a base 7. In addition, in the second embodiment, the torsion members 3 in the first embodiment are replaced with bending members 4. When one microactuator 9-1 is made to contract while the other microactuator 9-2 is made to expand, the bending members 4 deform as shown in FIG. 6B, and a finger mount member 8 tilts. As a consequence, a finger 5 rotates counterclockwise about an axis perpendicular to the drawing surface. This makes it possible to change the direction and posture of a manipulation target object 6 gasped by the finger 5.

In this case, the two microactuators 9-1 and 9-2 are used. However, since the posture of the manipulation target object 6 can be changed by making one of the microactuators contract, only one microactuator may be mounted between one of the rod-like members of the arm and the base 7. Even if one or both of the rod-like members of the arm themselves are replaced with a microactuator like that described above, similar operation can be realized.

Figure 8:
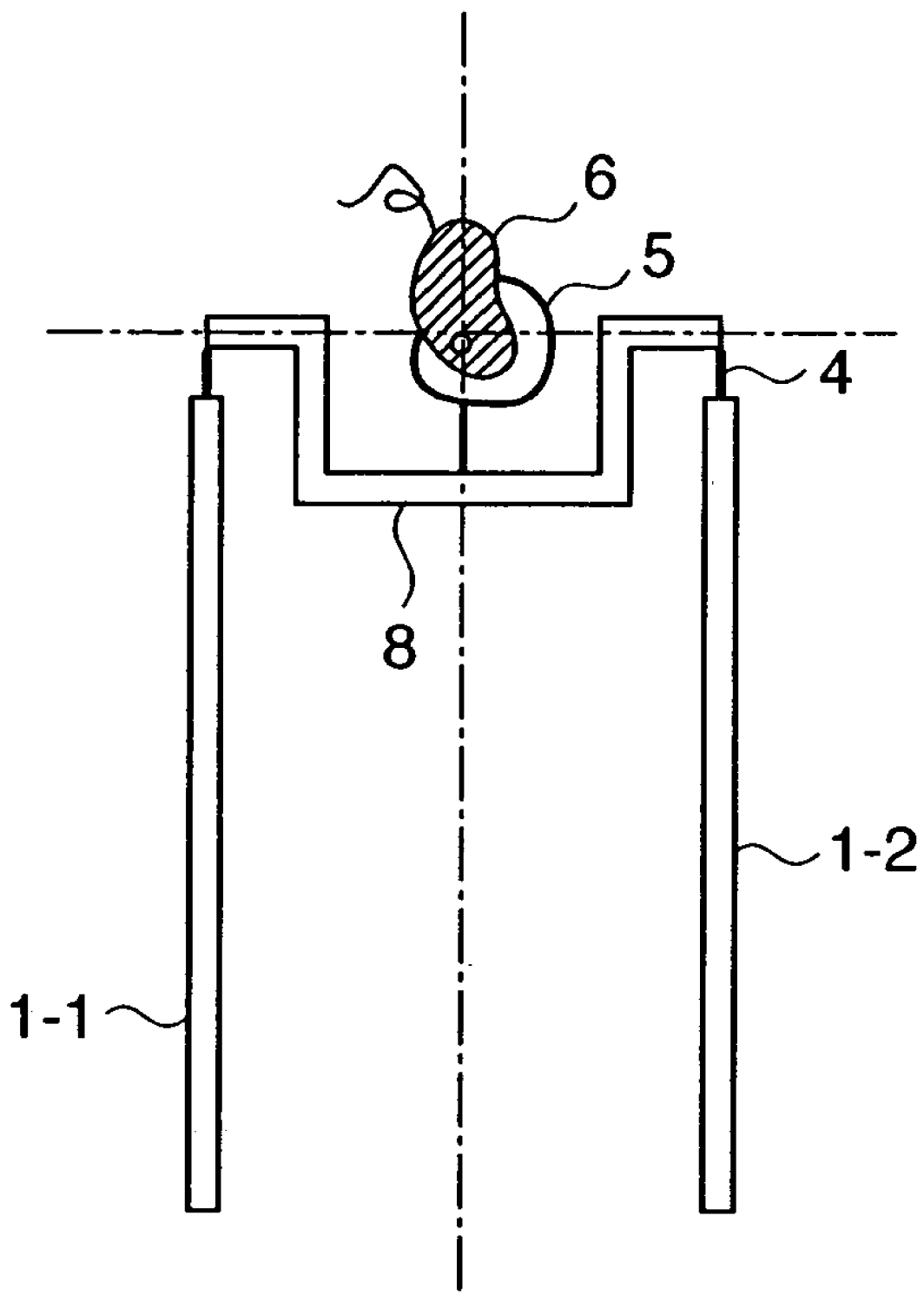
FIG. 8 is a view showing a hand mechanism in which a manipulation target object is set on the rotation center in a modification to the second embodiment.

FIG. 8 shows the structure of the finger mount member 8 for a case wherein the rotation center of the manipulation target object 6 grasped by the finger 5 is made to match the central portion of the finger 5 more accurately. In this case, the shape of the finger mount member 8 is changed such that the central portion of the finger 5 is almost located on a line connecting the two end portions of the finger mount member 8 which are coupled to the rod-like members 1-1 and 1-2 through the bending members 4. With this structure, since the position of the manipulation target object 6 hardly moves even if the posture of the manipulation target object 6 changes, the manipulation target object does not move out of the narrow visual field of a microscope or the like during observation. This eliminates more reliably the necessity to interrupt manipulation for the adjustment of the visual field.

Figure 7:
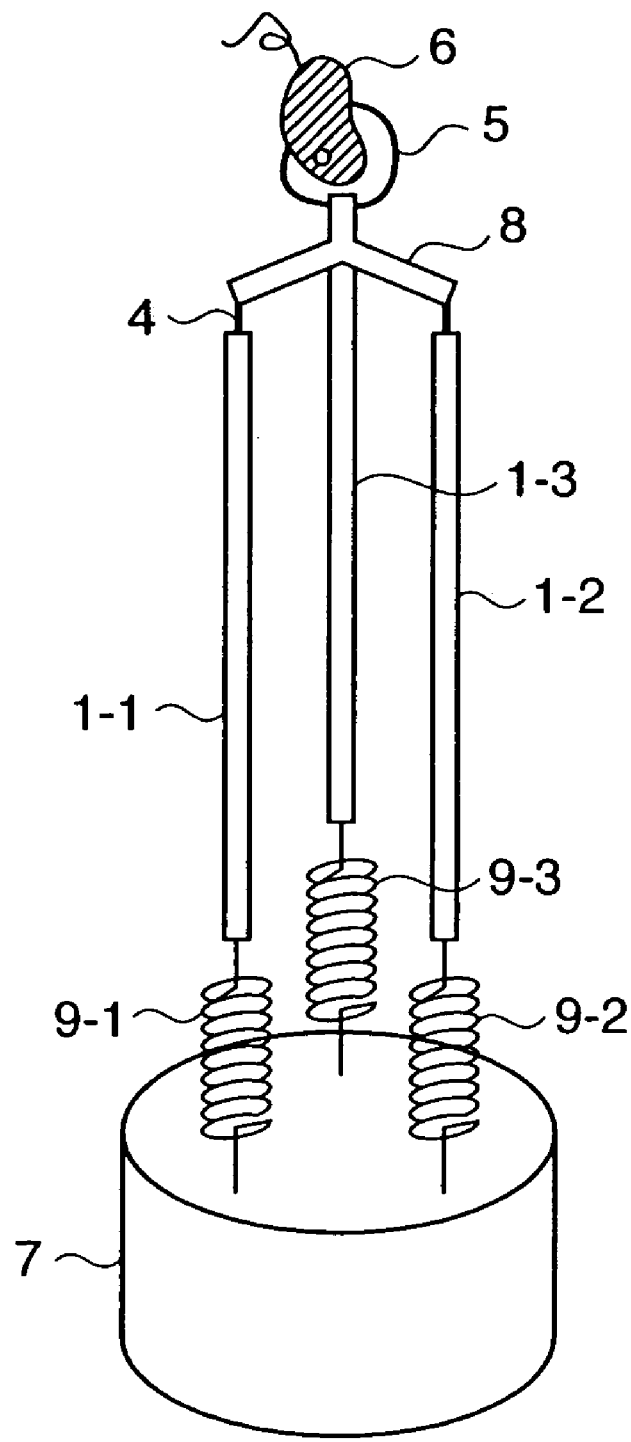
FIG. 7 is a view for explaining a modification to the second embodiment.

FIG. 7 shows a modification to the second embodiment. In this case, three rod-like members 1-1, 1-2, and 1-3 of an arm are used, and three microactuators 9-1, 9-2, and 9-3 are provided for the rod-like members 1-1, 1-2., and 1-3 of the arm, respectively. In accordance with this structure, the finger mount member 8 is trifurcated (the respective branch portions extend from the central portion at angular intervals of 120°), and the finger 5 is mounted on the central portion.

In this embodiment, properly selecting the number and positions of microactuators 9 that contract makes it possible to cause not only rotation about an axis almost perpendicular to the drawing surface but also rotation about an axis almost orthogonal to the axis. In this case as well, the number of microactuators can be decreased by one, and the posture of the manipulation target object 6 grasped by the finger 5 can be controlled by using two microactuators 9.

Third Embodiment

Figure 9:
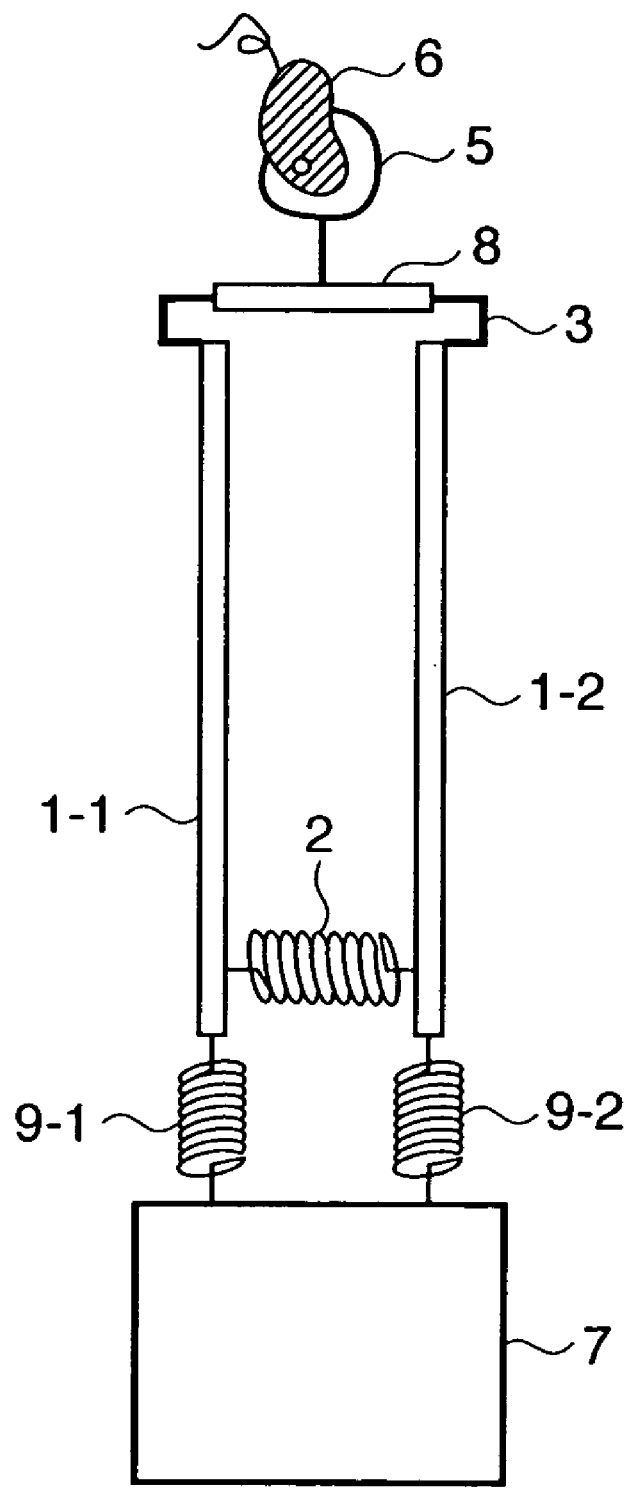
FIG. 9 is a view for explaining the third embodiment of the manipulating apparatus of the present invention, which is a combination of the first and second embodiments.

FIG. 9 shows an arrangement obtained by combining the arrangements of the first and second embodiments. This arrangement realizes the functions of both the embodiments. In this embodiment, when an actuator 2 acts, it moves in the same manner as in the first embodiment, and actuators 9-1 and 9-2 function as bending members. When an actuator 9 acts, it moves in the same manner as in the second embodiment, and torsion members 3 function as bending members. In addition, when the actuators 2, 9-1, and 9-2 act, they can make a combination of movements in the two embodiments.

Fourth Embodiment

Figure 10:
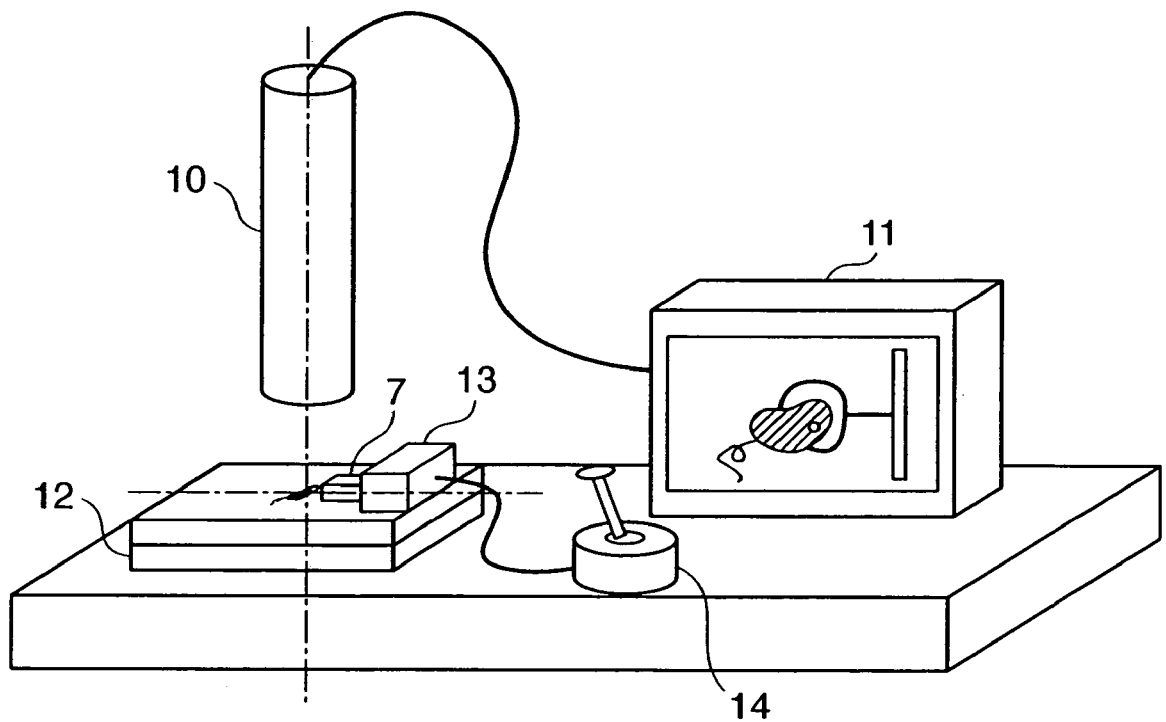
FIG. 10 is a view for explaining the overall system of a manipulator apparatus according to the fourth embodiment of the present invention.

FIG. 10 is a view for explaining the overall system of a manipulator apparatus including a minute object manipulating apparatus. Referring to FIG. 10, reference numeral 10 denotes a microscope; 11, a monitor; 12, an X-Y stage on which a manipulation target object is placed, together with a micro-hand, arm, and the like which manipulate the object like those in the above embodiments; and 13, a controller which controls the operation of the arm and hand mounted on a base 7 on the basis of manipulation signals from a remote controller 14. The operator can manipulate the minute target object as he/she likes by manipulating the arm and micro-hand using the remote controller 14 while watching the monitor 11 of the microscope 10.

As has been described above, according to the preferred embodiments of the present invention, a manipulator includes a plurality of arm members whose attitudes can be changed, and a manipulation target object manipulating hand mounted on the plurality of arm members through a connecting portion. By changing the attitudes of the plurality of arms, the hand can cause rotation or similar motion. Therefore, an arm mechanism which can cause rotation of a manipulation target object or similar motion can be realized by using a simple mechanism. Therefore, a compact apparatus can be easily realized. In addition, even if a manipulation target object is made to undergo rotation or similar motion within the visual field of a microscope by using this apparatus, the object can be prevented from greatly moving out of the visual field or depth of focus of the fixed microscope. This reduces the operation of adjusting the visual field or depth of focus of the microscope in the process of manipulation, and hence facilitates operation using the microscope. This makes it possible for not only highly skilled operators but also any operators to perform operation. In addition, the operation time can be shortened, and hence the fatigue of the operator can be reduced, leading to an increase in the success rate of manipulations.

As many apparently widely different embodiments of the present invention can be made without departing from the spirit and scope thereof, it is to be understood that the invention is not limited to the specific embodiments thereof except as defined in the claims.

What is claimed is:

1. A manipulator comprising:
    a plurality of arm members whose attitudes can be changed;
    a manipulation target object manipulating hand mounted on said plurality of arm members through a connecting portion, and
    an actuator operatively coupled to at least one of said arm members for changing the attitudes of said plurality of arm members,
    wherein the attitudes including a parallel state and an intersection state of said plurality of arm members are changed by controlling said actuator, thereby causing rotation of said hand about an axis parallel to said arm members in the parallel state.

2. The manipulator according to claim 1, wherein attitudes are changed by expand/contract of said actuator, thereby causing movement of said hand.

* * * * *

UNITED STATES PATENT AND TRADEMARK OFFICE
CERTIFICATE OF CORRECTION

PATENT NO. : 7,195,441 B2  
APPLICATION NO. : 10/802819  
DATED : March 18, 2007  
INVENTOR(S) : Ichiro Okumura et al.

Page 1 of 1

It is certified that error appears in the above-identified patent and that said Letters Patent is hereby corrected as shown below:

COLUMN 1:

Line 7, "assemblies" should read --assembles--.

COLUMN 3:

Line 16, "achieve" should read --achieves--.

COLUMN 4:

Line 17, "which" should read --with--.

COLUMN 6:

Line 12, "gasped" should read --grasped--.

Signed and Sealed this

Twenty-third Day of September, 2008

JON W. DUDAS  
*Director of the United States Patent and Trademark Office*

UNITED STATES PATENT AND TRADEMARK OFFICE
CERTIFICATE OF CORRECTION

PATENT NO. : 7,195,441 B2 Page 1 of 1
APPLICATION NO. : 10/802819
DATED : March 27, 2007
INVENTOR(S) : Ichiro Okumura et al.

It is certified that error appears in the above-identified patent and that said Letters Patent is hereby corrected as shown below:

COLUMN 1:

Line 7, "assemblies" should read --assembles--.

COLUMN 3:

Line 16, "achieve" should read --achieves--.

COLUMN 4:

Line 17, "which" should read --with--.

COLUMN 6:

Line 12, "gasped" should read --grasped--.

This certificate supersedes the Certificate of Correction issued September 23, 2008.

Signed and Sealed this

Fourteenth Day of October, 2008

JON W. DUDAS
*Director of the United States Patent and Trademark Office*